WILLIAM E. ROBBINS & GEORGE EUDERTON.
Improvement in Harrows.
No. 115,525.   Patented May 30, 1871.
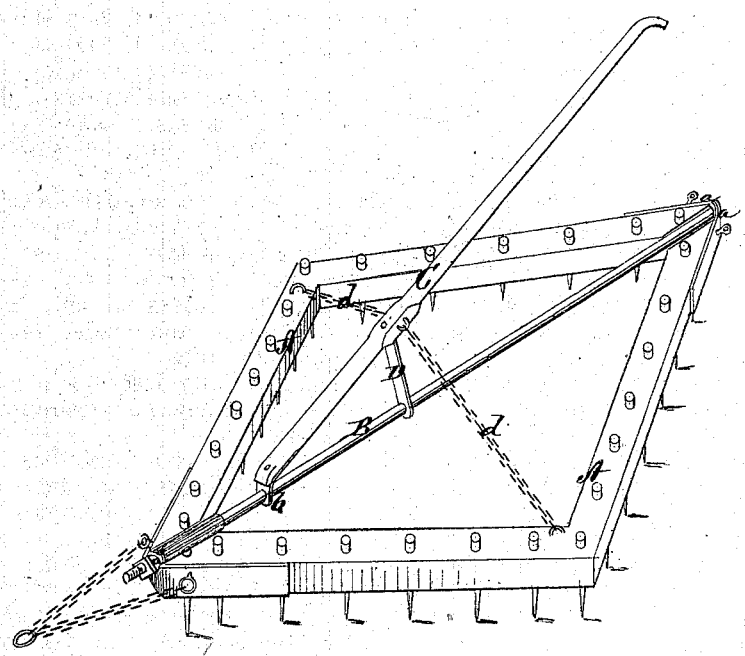
Witnesses.
C. L. Evert
Jas. E. Hutchinson
Inventor.
Wm. E. Robbins.
George Euderton
per Alexander Mason
attys.

UNITED STATES PATENT OFFICE.

WILLIAM E. ROBBINS AND GEORGE ENDERTON, OF STERLING, ILL., ASSIGNORS OF ONE-THIRD THEIR RIGHT TO ABRAM B. ENDERTON, OF SAME PLACE.

IMPROVEMENT IN HARROWS.

Specification forming part of Letters Patent No. 115,525, dated May 30, 1871.

*To all whom it may concern:*

Be it known that we, WILLIAM E. ROBBINS and GEORGE ENDERTON, of Sterling, in the county of Whitesides and in the State of Illinois, have invented certain new and useful Improvements in Harrow; and do hereby declare that the following is a full, clear, and exact description thereof, reference being had to the accompanying drawing and to the letters of reference marked thereon making a part of this specification.

The nature of our invention consists in the construction and arrangement of a harrow, as will be hereinafter more fully set forth.

In order to enable others skilled in the art to which our invention appertains to make and use the same, we will now proceed to describe its construction and operation, referring to the annexed drawing, which represents a perspective view of our harrow.

Our harrow is constructed in two triangular sections, A A, connected at the front and rear corners by means of an iron rod, B, running through the lap-hinges *a a* in such a manner as to admit of either section of the harrow rising or dropping independent of the other, thus readily adapting itself to any unevenness of ground, reaching the slightest depression or elevation, and doing its work in a thorough manner. C represents a lever, sliding upon the rod B by means of a plate, *b*, attached to its front end. A bar, D, is attached to the under side of the lever C at a suitable point, and the rod B passes through the lower end of said bar. The lever C is, by chains *d d*, connected with opposite corners of the harrow.

This device renders it easy even for a boy to operate it with ease and safety in cornstalk or sod ground.

By the use of the lever the harrow can be lifted over a stump or any other obstacle without slacking the motion; and also one-half of the harrow can be turned over onto the other and back again while in motion. The harrow can be uncoupled and loaded into a wagon without heavy lifting.

Having thus fully described our invention, what we claim as new, and desire to secure by Letters Patent, is—

The triangular harrow-sections A A, provided with lap-hinges *a a*, and coupled by means of a rod, B, in combination with the lever C, bar D, and chains *d d*, when said lever slides upon the rod B, and is connected by the chains *d d* with the opposite corners of the triangular harrow-sections, substantially as and for the purposes herein set forth.

In testimony that we claim the foregoing we have hereunto set our hands.

WILLIAM E. ROBBINS.
    GEORGE ENDERTON.

Witnesses:
  F. WILLIAMS,
  DAVID LEAVITT.